(12) United States Patent
Kang et al.

(10) Patent No.: US 9,405,675 B1
(45) Date of Patent: *Aug. 2, 2016

(54) SYSTEM AND METHOD FOR MANAGING EXECUTION OF INTERNAL COMMANDS AND HOST COMMANDS IN A SOLID-STATE MEMORY

(71) Applicant: Western Digital Technologies, Inc., Irvine, CA (US)

(72) Inventors: Ho-Fan Kang, Aliso Viejo, CA (US); Lan D. Phan, Laguna Hills, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 103 days.

This patent is subject to a terminal disclaimer.

(21) Appl. No.: 14/303,508

(22) Filed: Jun. 12, 2014

Related U.S. Application Data

(63) Continuation of application No. 12/777,771, filed on May 11, 2010, now Pat. No. 8,782,327.

(51) Int. Cl.
*G06F 12/00* (2006.01)
*G06F 12/02* (2006.01)

(52) U.S. Cl.
CPC .... *G06F 12/0246* (2013.01); *G06F 2212/7201* (2013.01)

(58) Field of Classification Search
None
See application file for complete search history.

(56) References Cited

U.S. PATENT DOCUMENTS

| | | |
|---|---|---|
| 5,093,780 A | 3/1992 | Sunahara |
| 5,123,094 A | 6/1992 | MacDougall |
| 5,634,099 A | 5/1997 | Andrews et al. |
| 6,088,740 A | 7/2000 | Ghaffari et al. |
| 6,205,521 B1 | 3/2001 | Schumann |
| 6,338,122 B1 | 1/2002 | Baumgartner et al. |
| 6,475,062 B1 | 11/2002 | Kubota et al. |
| 6,678,801 B1 | 1/2004 | Greim et al. |
| 6,757,781 B2 | 6/2004 | Williams et al. |
| 6,760,820 B2 | 7/2004 | Henson et al. |
| 6,856,556 B1 | 2/2005 | Hajeck |
| 6,862,151 B2 | 3/2005 | Hoskins et al. |
| 6,969,989 B1 | 11/2005 | Mei |

(Continued)

OTHER PUBLICATIONS

Hu et al., "Write Amplification Analysis in Flash-Based Solid State Drives", SYSTOR'09, Haifa, 2009, Zurich Research Laboratory,copyright 2009 IBM Corporation, downloaded on May 12, 2010 from https://www.research.ibm.com/haifa/conferences/systor2009/papers/2_2_2.pdf, 13 pages.

(Continued)

*Primary Examiner* — Kaushikkumar Patel
(74) *Attorney, Agent, or Firm* — Wilmer Cutler Pickering Hale and Dorr LLP

(57) ABSTRACT

Embodiments of the invention are directed to enable simultaneous or nearly simultaneous execution of internal and host-issued commands in a non-volatile storage subsystem while maintaining data consistency. Embodiments maintain validity information on data residing at physical addresses as well as logical to physical address mappings in the solid-state storage subsystem. In one embodiment, a controller within the storage subsystem selectively cancels internal commands that it determines to be writing data that has been rendered invalid by another command. In one embodiment, the determination is made by consulting the validity information kept by the controller in an invalid page table.

19 Claims, 6 Drawing Sheets

(56) References Cited

U.S. PATENT DOCUMENTS

| | | |
|---|---|---|
| 7,082,494 B1 | 7/2006 | Thelin et al. |
| 7,114,041 B2 | 9/2006 | Hammitt et al. |
| 7,126,857 B2 | 10/2006 | Hajeck |
| 7,174,467 B1 | 2/2007 | Helms et al. |
| 7,310,699 B2 | 12/2007 | Sinclair |
| 7,313,641 B2 | 12/2007 | Koch et al. |
| 7,315,917 B2 | 1/2008 | Bennett et al. |
| 7,340,580 B2 | 3/2008 | Kinoshita |
| 7,363,396 B2 | 4/2008 | Liu et al. |
| 7,363,421 B2 | 4/2008 | Di Sena et al. |
| 7,366,826 B2 | 4/2008 | Gorobets et al. |
| 7,406,547 B2 | 7/2008 | Haines et al. |
| 7,424,587 B2 | 9/2008 | Caulkins et al. |
| 7,430,136 B2 | 9/2008 | Merry, Jr. et al. |
| 7,441,054 B2 | 10/2008 | Wu et al. |
| 7,441,067 B2 | 10/2008 | Gorobets et al. |
| 7,447,807 B1 | 11/2008 | Merry et al. |
| 7,457,903 B2 | 11/2008 | Purdham et al. |
| 7,487,286 B2 | 2/2009 | Nagano et al. |
| 7,502,256 B2 | 3/2009 | Merry, Jr. et al. |
| 7,509,441 B1 | 3/2009 | Merry et al. |
| 7,582,868 B2 | 9/2009 | Jiang et al. |
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,831,783 B2 | 11/2010 | Pandit et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2001/0034809 A1 | 10/2001 | Ogawa |
| 2002/0040413 A1 | 4/2002 | Okada et al. |
| 2002/0083111 A1 | 6/2002 | Row et al. |
| 2004/0193743 A1 | 9/2004 | Byers et al. |
| 2005/0193081 A1 | 9/2005 | Gruber et al. |
| 2005/0204187 A1 | 9/2005 | Lee et al. |
| 2006/0155917 A1 | 7/2006 | Di Sena et al. |
| 2006/0161724 A1 | 7/2006 | Bennett et al. |
| 2007/0016721 A1 | 1/2007 | Gay |
| 2007/0033332 A1 | 2/2007 | Sinclair et al. |
| 2007/0043900 A1 | 2/2007 | Yun |
| 2007/0186032 A1 | 8/2007 | Sinclair et al. |
| 2007/0186065 A1 | 8/2007 | Lee et al. |
| 2008/0082736 A1 | 4/2008 | Chow et al. |
| 2008/0091872 A1 | 4/2008 | Bennett et al. |
| 2008/0126685 A1 | 5/2008 | Danilak |
| 2008/0126719 A1 | 5/2008 | Danilak |
| 2008/0126720 A1 | 5/2008 | Danilak |
| 2008/0126891 A1 | 5/2008 | Danilak |
| 2008/0155166 A1 | 6/2008 | James et al. |
| 2008/0235443 A1 | 9/2008 | Chow et al. |
| 2008/0263305 A1 | 10/2008 | Shu et al. |
| 2008/0282024 A1 | 11/2008 | Biswas et al. |
| 2008/0288717 A1 | 11/2008 | Torabi |
| 2008/0307164 A1 | 12/2008 | Sinclair |
| 2009/0012976 A1 | 1/2009 | Kang et al. |
| 2009/0017220 A1 | 1/2009 | Muller et al. |
| 2009/0070502 A1 | 3/2009 | Noha et al. |
| 2009/0116475 A1 | 5/2009 | Krzyzanowski et al. |
| 2009/0119460 A1 | 5/2009 | Lin et al. |
| 2009/0129163 A1 | 5/2009 | Danilak |
| 2009/0150599 A1 | 6/2009 | Bennett |
| 2009/0154026 A1 | 6/2009 | Jiang et al. |
| 2009/0172250 A1 | 7/2009 | Allen et al. |
| 2009/0172258 A1 | 7/2009 | Olbrich et al. |
| 2009/0172260 A1 | 7/2009 | Olbrich et al. |
| 2009/0271562 A1 | 10/2009 | Sinclair |
| 2009/0313501 A1 | 12/2009 | Hallivuori |
| 2010/0023672 A1 | 1/2010 | Gorobets et al. |
| 2010/0037009 A1 | 2/2010 | Yano et al. |
| 2010/0174849 A1 | 7/2010 | Walston et al. |
| 2010/0185806 A1 | 7/2010 | Pruthi et al. |
| 2010/0250793 A1 | 9/2010 | Syu |
| 2010/0262760 A1 | 10/2010 | Swing et al. |
| 2011/0022778 A1 | 1/2011 | Schibilla et al. |
| 2011/0055455 A1 | 3/2011 | Post et al. |
| 2011/0055458 A1 | 3/2011 | Kuehne |
| 2011/0099323 A1 | 4/2011 | Syu |
| 2011/0191566 A1 | 8/2011 | Takamiya et al. |
| 2011/0231624 A1 | 9/2011 | Fukutomi et al. |
| 2011/0283049 A1 | 11/2011 | Kang et al. |
| 2012/0239851 A1 | 9/2012 | Calvert et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0024595 A1 | 1/2013 | Subramaniyan et al. |
| 2013/0132638 A1 | 5/2013 | Horn et al. |
| 2013/0145106 A1 | 6/2013 | Kan |
| 2013/0290793 A1 | 10/2013 | Booth et al. |

(56) References Cited

U.S. PATENT DOCUMENTS

| | | |
|---|---|---|
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

OTHER PUBLICATIONS

Taratorin, Alexander M. and Klaas B. Klassen, Observation of Recording Pole Instability in Perpendicular Recording, IEEE Transaction on Magnetics, vol. 42, No. 10, Oct. 2006, pp. 2267-2269.

http://www.anandtech.com, downloaded from website on Jun. 17, 2011.

Office Action under U.S. Appl. No. 12/771,771 dated May 22, 2012.

Office Action under U.S. Appl. No. 12/771,771 dated Oct. 24, 2012.

Notice of Allowance dated Apr. 2, 2013 in U.S. Appl. No. 12/777,771, 8 pages.

Office Action dated May 22, 2012 in U.S. Appl. No. 12/778,740, x pages.

Office Action dated Sep. 28, 2012 in U.S. Appl. No. 12/778,740, x pages.

Final Office Action dated Apr. 2, 2013 in U.S. Appl. No. 12/778,740, x pages.

Notice of Allowance dated Aug. 22, 2014 in U.S. Appl. No. 12/778,740 22 pages.

Ho-Fan Kang, U.S. Appl. No. 12/778,740 filed May 12, 2010, 17 pages.

Lan D. Phan, U.S. Appl. No. 13/166,985, filed Jun. 23, 2011, 27 pages.

Ho-Fan Kang, U.S. Appl. No. 13/162,894, filed Jun. 17, 2011 27 pages.

Webpage for Anandtech, location at http://www.anandtech.com, last accessed on Jun. 17, 2011.

Hu et al., "Write Amplification Analysis in Flash-Based Solid State Drives", SYSTOR'09, Zurich Research Laboratory, copyright 2009 IBM Corporation, downloaded on May 12, 2010 from https://www.research.ibm.com/haifa/conferences/systor2009/papers/2_2_2.pdf, 13 pages.

Office Action under U.S. Appl. No. 12/778,740 dated May 22, 2012.

Office Action under U.S. Appl. No. 12/778,740 dated Sep. 28, 2012.

Taratorin, Alexander M. and Klaas B. Klassen, "Observation of Recording Pole Instability in Perpendicular Recording," IEEE Transaction on Magnetics, vol. 42, No. 10, Oct. 2006, pp. 2267-2269.

SYSTEM AND METHOD FOR MANAGING EXECUTION OF INTERNAL COMMANDS AND HOST COMMANDS IN A SOLID-STATE MEMORY

RELATED APPLICATION

This application is a continuation of U.S. application Ser. No. 12/777,771, filed on May 11, 2010 and titled "SYSTEM AND METHOD FOR MANAGING EXECUTION OF INTERNAL COMMANDS AND HOST COMMANDS IN A SOLID-STATE MEMORY," the disclosure of which is hereby incorporated by reference in its entirety.

BACKGROUND

Solid-state storage subsystems execute many internal commands in the course of their normal operation. For example, garbage collection is frequently performed on memory blocks that may contain both valid and invalid data. When such a memory block is selected for garbage collection, the garbage collection operation copies valid data within the memory block to a new location in memory and then erases the entire memory block, making the entire block available for future data writes. In addition to garbage collection operations, solid-state storage subsystems also perform read and write operations as dictated by memory commands issued by host systems.

BRIEF DESCRIPTION OF THE DRAWINGS

Systems and methods which embody the various features of the invention will now be described with reference to the following drawings, in which.

DETAILED DESCRIPTION

Figure 1:
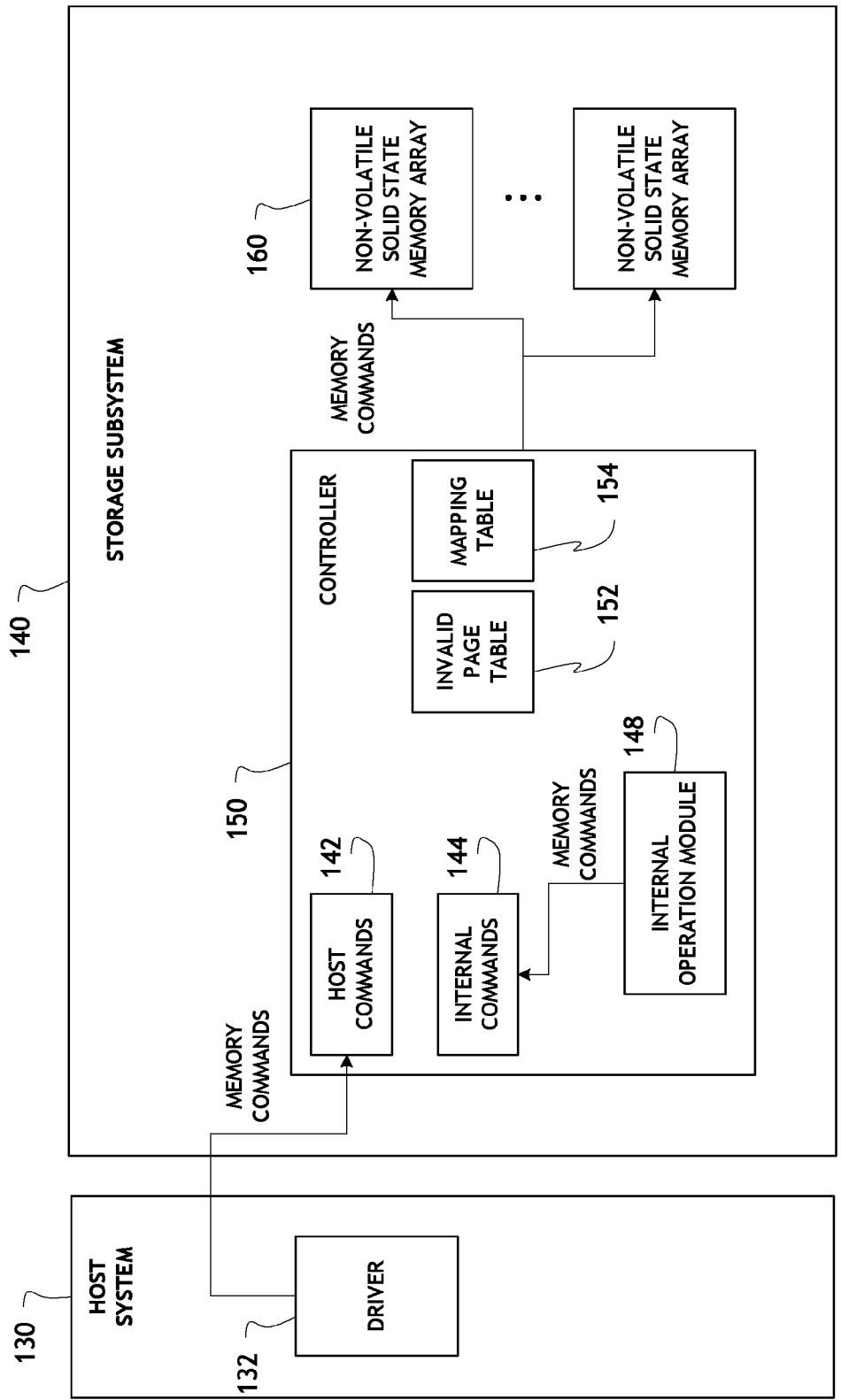
FIG. 1 is a block diagram illustrating a storage subsystem according to one embodiment.

While certain embodiments of the inventions have been described, these embodiments have been presented by way of example only, and are not intended to limit the scope of the inventions. Indeed, the novel methods and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

Overview

Solid-state storage subsystems perform internal system operations such as garbage collection and wear leveling to improve performance and longevity. Embodiments of the invention are directed to managing the simultaneous or nearly simultaneous execution of internal system commands (e.g. garbage collection commands) and commands received from host systems. Executing garbage collection commands with host-issued commands improves the performance of the storage subsystem by preventing stalls that can occur as a result of the storage subsystem running out of free blocks and being forced to execute garbage collection commands to free up blocks for pending host-issued commands. However, one challenge of executing internal system commands with host system commands is maintaining data consistency while executing both types of commands. For example, a garbage collection command may be issued to read data from a certain logical location "A" that corresponds to a physical location "X" and write the data to a new physical location "Y." While the read portion of the garbage collection command is completed and the write portion is awaiting execution, a host write command may cause new data to be written to the logical location "A," thus rendering the data to be written by the pending garbage collection command outdated. If the pending garbage collection write is allowed to execute, it would write the outdated data and cause data consistency issues.

In one embodiment of the invention, a controller manages the simultaneous or nearly simultaneous execution of internal commands and host commands by maintaining validity information on data residing at physical addresses in the solid-state storage subsystem and selectively cancelling a pending internal command if it is determined that the internal command is attempting to write data that has been rendered invalid by another command (e.g. a host-issued write command or another internal command). As will be further described below, the maintenance of validity information and selective execution of internal commands help ensure data consistency while allowing for the simultaneous or nearly simultaneous execution of internal commands and host commands. Although the present disclosure illustrates various embodiments by using garbage collection command examples, the disclosure is not so limited and is applicable to managing the execution of any type of internal system commands (e.g. wear leveling commands) with host-issued commands.

System Overview

FIG. 1 is a block diagram illustrating a storage subsystem embodiment. As shown, a storage subsystem 140 includes a controller 150, which in turn includes a host command queue 142, an internal command queue 144, and an internal operation module 148. In one embodiment, the host command queue 142 receives memory commands from a driver 132 residing within a host system 130 and the internal command queue 144 receives commands from the internal operation module 148, which may manage various internal operations such as garbage collection and/or wear leveling. In other embodiments, the commands from the driver 132 and the internal operation module 148 are received into a single queue for execution. The memory commands from the driver 132 may include write and read commands issued by the host system 130, while memory commands from the internal operation module 148 may include commands used for garbage collection. As further shown in FIG. 1, in one embodiment, the controller 150 executes the commands in the host command queue 142 and the internal command queue 144 in one or more non-volatile solid-state memory arrays 160.

In one embodiment, the controller 150 also maintains several data structures to help ensure that commands from the host command queue 142 and the internal command queue 144 are executed in a manner as further described herein to maintain data consistency. The data structures include, in one embodiment, an invalid page table 152 and a mapping table 154. In one embodiment, the invalid page table 152 keeps track of the validity of data located at physical page addresses throughout the non-volatile solid-state memory arrays 160, while the mapping table 154 keeps track of the correspondence between logical block addresses (LBA) and physical addresses in the non-volatile solid-state memory arrays 160.

Command Execution Examples

Figure 2A:
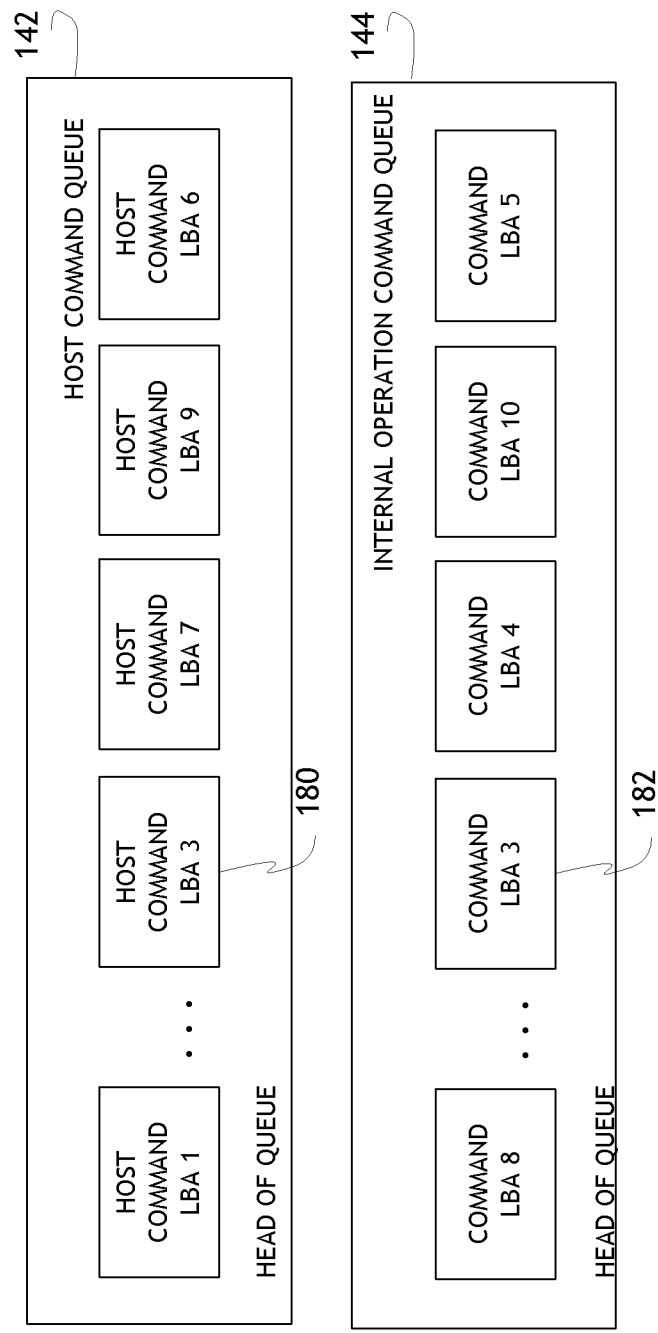
FIG. 2A shows an example of executing host-issued commands and internal commands according to one embodiment.

FIG. 2A is a block diagram illustrating an example of managing execution of memory commands. Although two queues are shown, the same management method can be applied to embodiments where commands are stored in one queue. Other embodiments may include more than two queues and the command execution management processes disclosed herein are applicable to those embodiments as well. In one embodiment, commands from both queues are concurrently processed and may be executed in a different order than the order in which the commands were originally placed into the respective queues. FIG. 2A also illustrates two commands 180 and 182 that are directed to the same LBA location (LBA 3), and embodiments of the invention are directed to maintaining data consistency while executing these commands, as further described below.

Figure 2B:
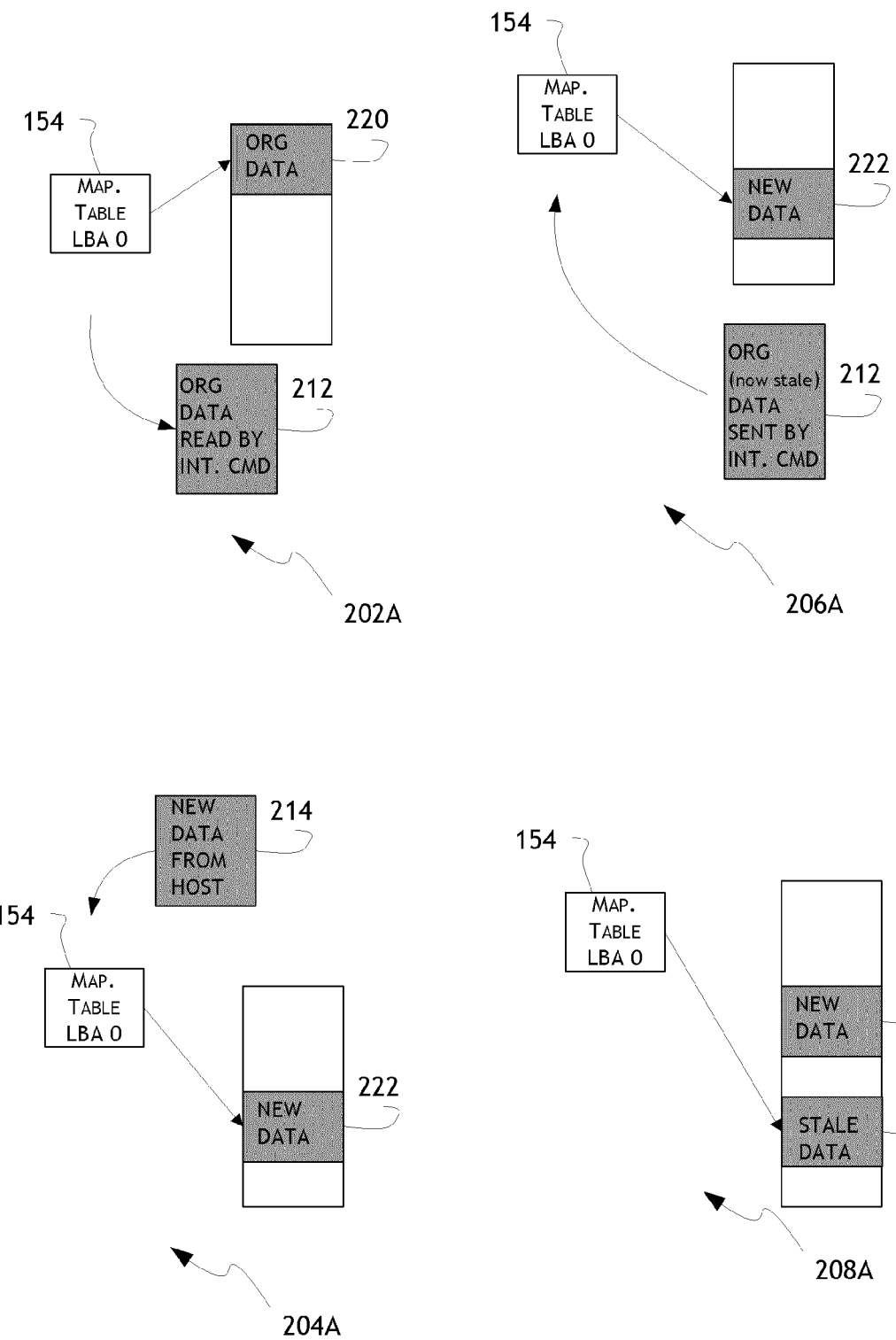
FIG. 2B shows an example risk of data consistency failure when host-issued commands are not synchronized with internal commands.

FIG. 2B shows an example risk of data consistency failure when host-issued commands are not synchronized with internal commands. As shown in FIG. 2B, host commands and internal commands that are directed to the same memory location (e.g. commands 180 and 182 shown in FIG. 2A) may be executed in a simultaneous or nearly simultaneous fashion. Illustration 202A shows an internal command 212 (e.g. a garbage collection command) reading data from a LBA 0 to copy the data to a new location. The LBA 0 entry in the mapping table 154 points to a physical address 220 at which the data is located. Illustration 204A shows a host-issued write command 214 writing to the same LBA 0 from which the internal command 212 has read data in illustration 202A. Illustration 204A shows that the mapping table 154 is updated to point to a physical address 222 at which the new data from the host is written. In illustration 206A, the internal command 212 attempts to complete the copy operation for the originally read data by updating the mapping table entry for LBA 0 to point to a new physical address. However, the original data is now stale because of the host write shown in illustration 204A. Without any synchronization, the internal command 212 is allowed to complete and illustration 208A shows the entry for LBA 0 in the mapping table 154 pointing to stale data at a physical address 224.

Figure 2C:
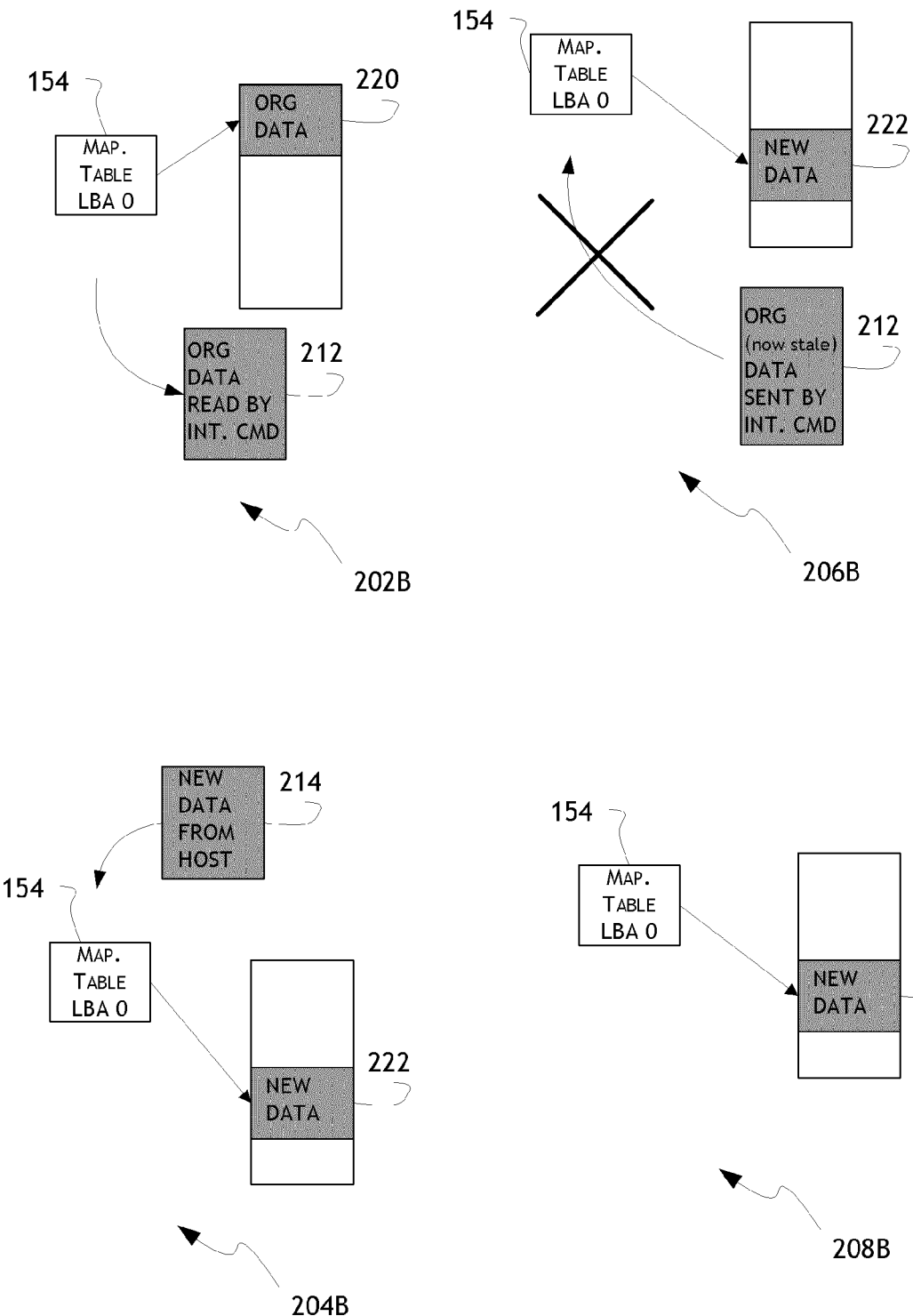
FIG. 2C illustrates an example of managing memory commands according to one embodiment.

FIG. 2C illustrates an example of managing memory commands according to one embodiment that eliminates the risk of failure illustrated in FIG. 2B by synchronizing host-issued write commands with internal commands such as garbage collection commands. Illustrations 202B and 204B in FIG. 2C are the same as their FIG. 2B counterparts 202A and 204, respectively. Illustration 206B shows that the command 212 is canceled as a result of the controller determining from the invalid page table 152 that the original data is no longer valid (stale) due to the host write in illustration 204B. In one embodiment, the invalid page table 152 indicates the validity status of data in the non-volatile memory arrays 160, and the controller is configured to cancel an internal command that attempts to write data indicated by the invalid page table as invalid. Illustration 208B shows that data consistency is preserved as a result of the cancellation, as the entry LBA 0 in the mapping table 154 continues to point to the new data written by the host.

Managing Write Locations

Figure 3A:
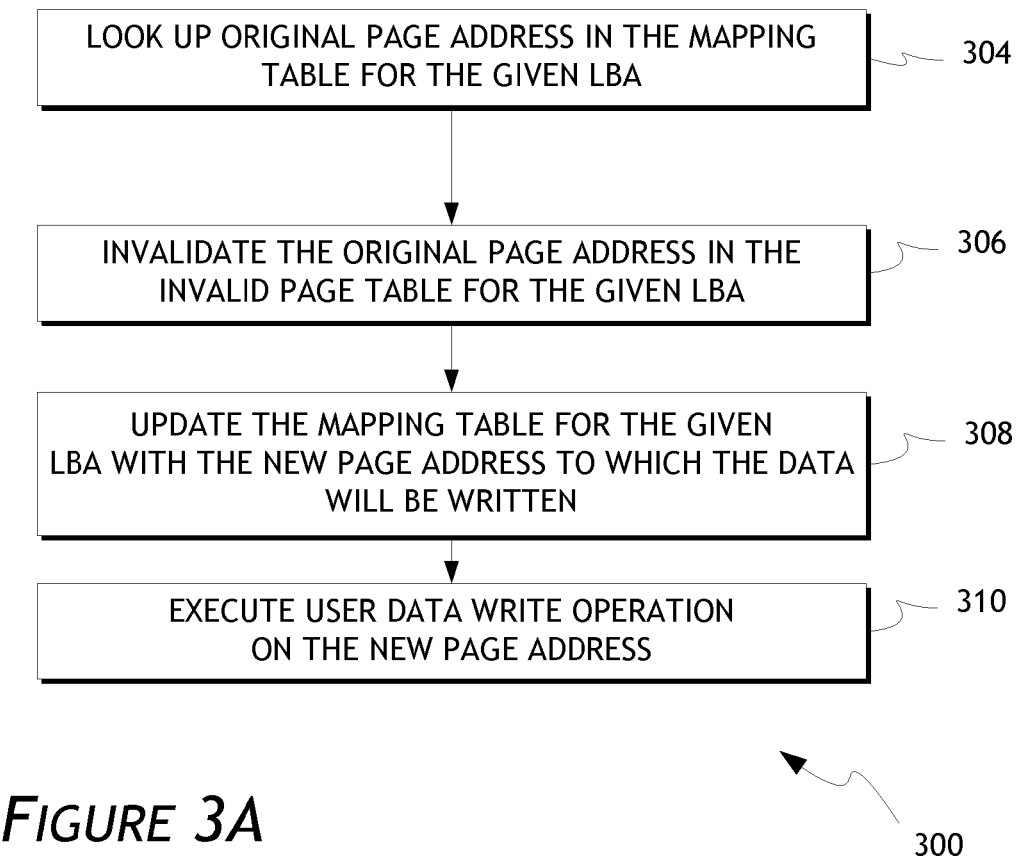
FIG. 3A is a flow diagram illustrating a method for managing memory commands in a solid-state storage subsystem according to one embodiment.

FIG. 3A is a flow diagram illustrating a method 300 for handling host-issued write commands in a solid-state storage subsystem according to one embodiment. In block 304, the controller 150 begins by looking up an original physical page address in the mapping table for a given LBA associated with a host-issued write command. Then in block 306, the controller 150 invalidates the original page address it obtained in block 304 in the invalid page table (e.g. by marking an entry with the original page address as invalid). Then in block 308, the controller updates the mapping table for the given LBA with the new physical page address at which the new data will be written at block 310. In block 310, the controller 150 executes the host write command on the new physical page address to write data there.

Figure 3B:
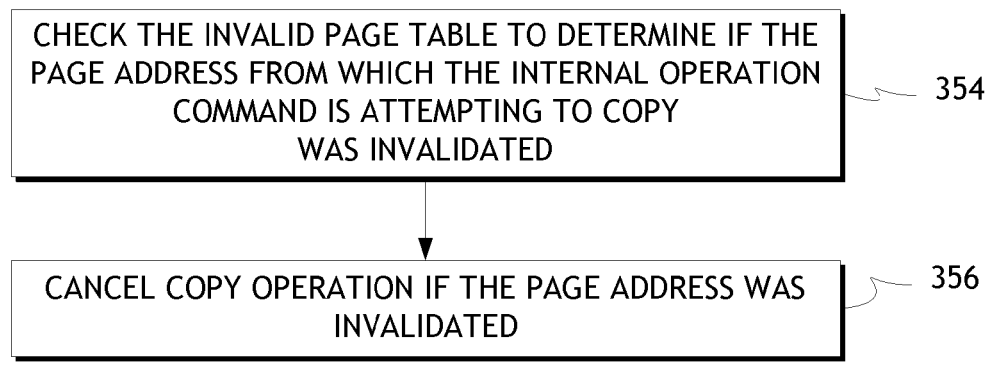
FIG. 3B is a flow diagram illustrating a method for managing memory commands in a solid-state storage subsystem according to one embodiment.

FIG. 3B is a flow diagram illustrating a method 350 for managing internal commands in a solid-state storage subsystem according to one embodiment. In one embodiment, the method 350 is performed by the controller 150 to determine whether a pending internal command should be executed. In block 354, the controller 150 checks the invalid page table to determine if the data at the physical page address from which the pending internal command is attempting to copy has been invalidated. For example, if an internal command is supposed to copy data located at a physical address "A" to a physical address "B," the controller would check the invalid page table to determine if the data at "A" has been invalidated. If the page address was invalidated, the controller 150 would cancel the internal copy command in block 356. In one embodiment, as an internal copy command includes a read and a write command, the check is performed prior to executing the read or the write command. In one embodiment, the check is performed prior to executing the write command. This checking and cancellation method prevents the writing of stale data. It would be apparent to one of ordinary skill in the art that the steps in FIGS. 3A and 3B could be performed in any appropriate order.

Figure 4:
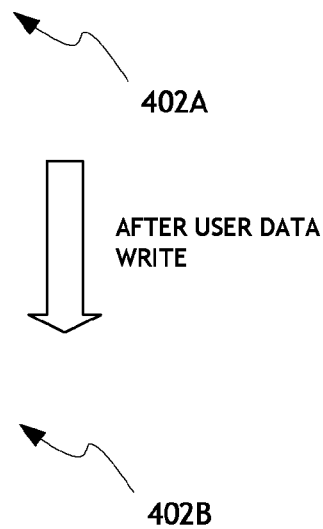
FIG. 4 illustrates an example mapping table and invalid table according to one embodiment.
Figure 4:
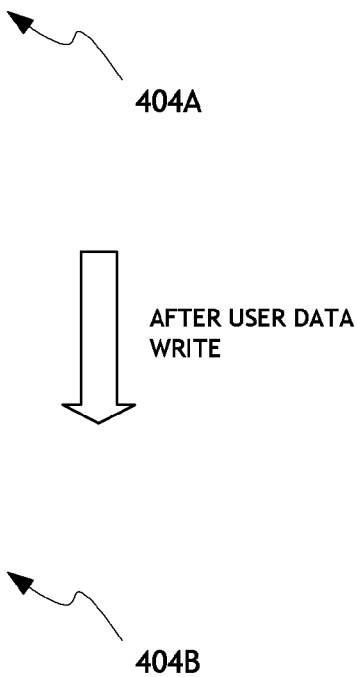

FIG. 4 illustrates an example mapping table 402 and an example invalid page table 404 and the changes to both tables as a result of executing of a host-issued write command (a user data write command). The mapping table 402A shows the mapping table before the execution of the user data write command. As shown, each entry maps an LBA to a corresponding physical address. For example, LBA 2 is mapped to the address block 0, page 14. As previously shown in block 308 of FIG. 3A, the mapping table is updated prior to a host-issued (user) data write. Here in FIG. 4, after the user data write operation is completed, the mapping table 402B shows an entry has been updated to reflect the state of the memory after the user data write. In this particular example, LBA 1 has been updated from block 0, page 13, to block 1, page 12 (shown in bold).

FIG. 4 also shows changes to the invalid page table 404 as a result of executing the user data write command. The invalid page table 404A shows the table before the execution, with the entry for block 0, page 13 indicating the address as containing valid data. As previously shown in block 306 of FIG. 3A, the invalid page table is updated as the controller executes a user data write command. In the invalid page table 404B, the entry for block 0, page 13 is changed to invalid as a result of the user data write operation. This means that the data in block 0, page 13 is no longer valid, and any pending internal command for that address will be blocked from execution. This change in the invalid page table 404B is related to that shown in the mapping table 402B (LBA 0 now corresponding to block 1, page 12). Also, the entry for block 1, page 12, is changed from an un-initialized (or empty) value to valid.

In one embodiment, the validity value of a particular entry in the invalid page table can be "valid," "invalid," or an un-initialized value. In another embodiment, the validity value of a particular entry can be "valid" or "invalid." In one embodiment, the invalid page table is implemented as a bitmask, and a bit is used to represent the validity of data at a page address. In one embodiment, the mapping table is implemented as an array of physical chunk addresses, and an index into the array is used to represent logical addresses associated with the physical chunk addresses. In one embodiment, one or both of the data structures employ atomic transactions so that pending changes to the data structures must complete before additional data access requests can be processed. This ensures that multiple controller processes (e.g. one handling host commands and another handling internal commands) that are accessing the data structures can read the most current data, thus preventing a process from executing a command that overwrites valid data with invalid data.

CONCLUSION

The features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method of managing memory operations in solid-state memory, the method comprising:
    accessing an internal command and a host command scheduled to be executed at least partially in parallel; wherein the internal command is a multipart command comprising at least a first portion and a second portion capable of being executed separately from the first portion;
    executing the first portion of the internal command, wherein executing the first portion of the internal command comprises accessing a physical page address;
    executing the host command prior to execution of the second portion of the internal command, wherein executing the host command comprises accessing the physical page address;
    determining whether the host command has modified data stored at the physical page address; and
    responsive to determining that the host command has modified the data stored at the physical page address, cancelling execution of the second portion of the internal command.

2. The method of claim 1, wherein the first portion of the internal command comprises a read command.

3. The method of claim 1, wherein the second portion of the internal command comprises a write command.

4. The method of claim 1, wherein determining whether the host command has modified the data stored at the physical page address comprises determining whether an invalid page table indicates that the data stored at the physical page address has been invalidated.

5. The method of claim 4, wherein the invalid page table is implemented as a bitmask.

6. The method of claim 1, wherein the host command and the internal command are stored in a single queue.

7. The method of claim 1, wherein the host command is stored in a first queue and the internal command is stored in a second queue.

8. The method of claim 7, wherein host commands stored in the first queue and internal commands stored in the second queue are at least partially executed concurrently.

9. A storage sub-system comprising:
    a non-volatile memory; and
    a controller configured to:
        access an internal command and a host command scheduled to be executed at least partially in parallel; wherein the internal command is a multi-part command comprising at least a first portion and a second portion capable of being executed separately from the first portion;
        execute the first portion of the internal command, wherein executing the first portion of the internal command comprises accessing a physical page address;
        execute the host command prior to execution of the second portion of the internal command, wherein executing the host command comprises accessing the physical page address;
        determine whether the host command has modified data stored at the physical page address; and
        responsive to determining that the host command has modified the data stored at the physical page address, cancel execution of the second portion of the internal command.

10. The storage sub-system of claim 9, wherein the first portion of the internal command comprises a read command.

11. The storage sub-system of claim 9, wherein the second portion of the internal command comprises a write command.

12. The storage sub-system of claim 9, wherein the controller is further configured to determine whether the host command has modified the data stored at the physical page address by determining whether an invalid page table indicates that the data stored at the physical page address has been invalidated.

13. The storage sub-system of claim 12, wherein the invalid page table is implemented as a bitmask.

14. The storage sub-system of claim 9, further comprising a queue configured to store the host command and the internal command.

15. The storage sub-system of claim 14, wherein the queue is maintained by the controller.

16. The storage sub-system of claim 9, further comprising a first queue configured to store the host command and a second queue configured to store the internal command.

17. The storage sub-system of claim 16, wherein host commands stored in the first queue and internal commands stored in the second queue are at least partially executed concurrently.

18. The storage sub-system of claim 16, wherein the first queue and the second queue are maintained by the controller.

19. The storage sub-system of claim 9, wherein the non-volatile memory comprises a solid-state non-volatile memory.

* * * * *